(12) United States Patent
Lindner et al.

(10) Patent No.: US 7,382,470 B2
(45) Date of Patent: Jun. 3, 2008

(54) INTERFEROMETRIC MEASURING DEVICE

(75) Inventors: Michael Lindner, Leutenbach (DE); Jochen Strähle, Weissach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/547,793

(22) PCT Filed: Feb. 28, 2005

(86) PCT No.: PCT/EP2005/050847

§ 371 (c)(1),
(2), (4) Date: Oct. 4, 2006

(87) PCT Pub. No.: WO2005/098353

PCT Pub. Date: Oct. 20, 2005

(65) Prior Publication Data

US 2007/0206200 A1    Sep. 6, 2007

(30) Foreign Application Priority Data

Apr. 5, 2004    (DE) .................. 10 2004 017 232

(51) Int. Cl.
*G01B 11/02* (2006.01)
(52) U.S. Cl. .................................................. 356/511
(58) Field of Classification Search ................ 356/496, 356/511–514, 493
See application file for complete search history.

(56) References Cited

U.S. PATENT DOCUMENTS

| 4,201,473 | A | * | 5/1980 | Domenicali et al. | 356/514 |
| 4,955,719 | A | * | 9/1990 | Hayes | 356/514 |
| 5,526,116 | A |   | 6/1996 | DeGroot et al. | |
| 5,555,472 | A | * | 9/1996 | Clapis et al. | 356/504 |
| 5,583,632 | A | * | 12/1996 | Haga | 356/129 |

(Continued)

FOREIGN PATENT DOCUMENTS

DE    197 21 842    12/1998

(Continued)

OTHER PUBLICATIONS

A. Donges, R. Noll, "Lasermesstechnik" (Laser Metrology) Hüthig Publishers 1993.

(Continued)

*Primary Examiner*—Patrick Connolly
*Assistant Examiner*—Scott M Richey
(74) *Attorney, Agent, or Firm*—Kenyon & Kenyon LLP

(57) ABSTRACT

An interferometric measuring device for three-dimensional measurement of shapes on an object to be measured having: a beam splitter receiving via an input light path, and splitting into measuring and reference light paths, light from a light source; an image pick-up, to which light reflected from the object and from a reference and brought into interference can be supplied via an output light path for conversion into electrical signals; an evaluation unit for determining the surface shape from the signals; and an adaptation device adapting the light intensity or interfering light signals. For increased measuring precision, the measuring device is configured to measure planar regions of the surface which extend over at least the measuring device's lateral resolution and the adaptation device is configured for adjusting the intensity of the light and/or the signals by locally varying reflective properties of the surface with respect to the measuring optics.

10 Claims, 2 Drawing Sheets

U.S. PATENT DOCUMENTS

| | | | |
|---|---|---|---|
| 6,552,798 B2 * | 4/2003 | Ina et al. | 356/493 |
| 6,717,680 B1 * | 4/2004 | Kuchel et al. | 356/514 |
| 6,813,029 B1 | 11/2004 | Lindner et al. | |
| 6,885,460 B2 * | 4/2005 | Morita | 356/514 |
| 6,943,895 B2 | 9/2005 | Prinzhausen et al. | |

FOREIGN PATENT DOCUMENTS

| | | |
|---|---|---|
| DE | 100 47 495 | 10/2001 |
| DE | 101 15 524 | 11/2001 |
| DE | 101 31 778 | 1/2003 |
| DE | 101 62 180 | 7/2003 |
| JP | 63263404 | 10/1988 |
| JP | 2001351842 | 12/2001 |
| JP | 2003529753 T | 10/2003 |
| JP | 2004506894 T | 3/2004 |
| WO | WO 01/27558 | 4/2001 |
| WO | WO 01/75395 | 10/2001 |
| WO | WO0175395 | 10/2001 |
| WO | WO0214845 | 2/2002 |
| WO | WO2004/003464 | 1/2004 |

OTHER PUBLICATIONS

P. DeGroot, L. Deck "Surface Profiling by Analysis of White-Light Interferograms in the Spatial Frequency Domain", J. Mod. Opt. vol. 42, No. 2, 389-401, 1995.

Th. Dresel, G. Häusler, H. Venzke, "Three Dimensional Sensing of Rough Surfaces by Coherence Radar", Appl. Opt. vol 31, No. 7, 919-925, 1992.

H.J. Tiziani, "Optical Methods for Precision Measurements", Optical and Quantum Electronics, vol. 21, 253-282, 1989.

K. Creath, "Temporal Phase Measurement Method", D.W. Robinson, T.G. Reid "Interferogram Analysis", IOP Publishing Bristol 1993.

R. Onodera, Y. Ishii, "Two -Wavelength Interferometry That Uses a Fourier Transform Method", Appl. Opt. vol. 37, No. 34, 7988-7994, 1998.

* cited by examiner

INTERFEROMETRIC MEASURING DEVICE

FIELD OF THE INVENTION

The present invention relates to an interferometric measuring device for the three-dimensional measurement of shapes on objects to be measured having a beam splitter receiving light from a light source via an input light path and splitting it into a measuring light path and a reference light path, having an image pick-up, to which light reflected from the object to be measured and from a reference and brought into interference can be supplied via an output light path for conversion into electrical signals, an evaluation unit for determining the surface shape from the signals and having an adaptation device for adapting the light intensity or the signals received from the interfering light.

BACKGROUND INFORMATION

Various specific embodiments of interferometric measuring devices for the three-dimensional measuring of shapes on objects to be measured are described, for example, in connection with classic interferometry (see, e.g., A. Donges, R. Noll in "Lasermesstechnik" [Laser Metrology], Hüthig Publishers 1993), white-light interferometry, where light sources of short coherence length are used (e.g., light-emitting diode, superluminescent diode) (compare P. de Groot, L. Deck, "Surface Profiling by Analysis of White-Light Interferograms in the Spatial Frequency Domain" J. Mod. Opt., vol. 42, no. 2, 389-401, 1995; Th. Dresel, G. Häusler, H. Venzke; "Three-Dimensional Sensing of Rough surfaces by Coherence Radar", Appl. Opt., vol. 31, no. 7, 919-925, 1992; German Patent Application Nos. DE 199 48 813.4 and DE 100 15 878.1) and heterodyne interferometry (see, e.g., DE 197 21 842 C2; H. J. Tiziani, "Optical Methods for Precision Measurements", Optical and Quantum Electronics, vol. 21, 253-282, 1989; K. Creath, "Temporal Phase Measurement Method" in d. W. Robinson, T. G. Reid: "Interferogram Analysis", IOP Publishing Bristol 1993; R. Onodera, Y. Ishii, "Two-Wavelength Interferometry That Uses a Fourier Transform Method", Appl. Opt., vol. 37, no. 34, 7988-7994, 1998).

White-light interferometry established itself as a method of measurement particularly for the three-dimensional measuring of shapes. The setup is typically implemented using a Michelson interferometer. The object is imaged on an image pickup, for example of a CCD camera, via an objective located in an object light path and is superimposed by a flat reference wave. The depth scanning (in the z-direction) may be performed as a scan of a reference mirror located in the reference light path or of the object. When scanning the object, the image plane of the objective and the reference plane are in the same plane. The object is moved only in the depth axis relative to the reference plane. When scanning the reference mirror, only the reference mirror is moved.

The object remains immobile with respect to the objective. In this instance, the depth measurement range is limited by the objective's depth of field. With this measuring method it is possible advantageously to measure industrial surfaces at a depth resolution of a few nm (1-10 nm).

An advantageous further development of a white-light interferometer is described in German Patent Application No. DE 101 15 524 A1, wherein an optical setup for producing a flat intermediate image is situated in the measuring light path, for example an endoscope optics. The depth scan may be implemented as a scan of the reference or as an intermediate image scan. A white-light interferometer including an intermediate image of the object or an endoscope is also described in German Patent Application No. DE 100 47 495 A1. These white-light interferometers also achieve a depth resolution of industrial surfaces of a few nm, while additionally allowing for measurements in narrow and deep bore holes.

In a further development of an optical 3-D measuring device described in German Patent Application No. DE 101 31 778 A1, likewise a white-light interferometer for example, an objective optics is situated on the object light path, which also makes it possible to measure curved surface regions or circumferential radial-symmetric surface regions, for example valve seats, a depth resolution of a few nm being achieved as well and measurement also being possible in narrow and deep bore holes.

German Patent Application No. DE 101 62 180 A1 describes arranging an electrically controllable filter in the measuring arm and/or reference arm of an interferometric measuring device in order to adjust the intensities of the reference beam and the measuring beam to each other.

In the measurement of real industrial surfaces using interferometric measuring devices of the kind mentioned, precise, reliable measurements, however, are frequently hampered by the given surface properties, particularly when special optics are used in order to conduct measurements in the case of special surface shapes.

SUMMARY

An object of the present invention is to provide an interferometric measuring device which allows for a more precise evaluation of the interference patterns of the light even in the case of optically unfavorable surfaces.

In accordance with an example embodiment of the present invention, the measuring device is configured to measure planar regions of the surface which extend over at least the lateral resolution of the measuring device (preferably a multiple thereof) and an adaptation device is configured for adjusting the intensity of the light and/or of the signals obtained from the light as a function of locally varying reflective properties of the surface with regard to the measuring optics.

With these measures it is possible during the dept scan to adjust the light conditions in the interferometer and/or in the object arm and reference arm relative to the light intensities effectively reflected back into the aperture from various regions or zones of the surface such that depending on the particular measuring point viewed the information obtained by the interference between the object light and the reference light can be recorded and evaluated in an optimal manner. In this way, precise measurements may be obtained, even on object surfaces that have a varying reflectivity across their surface area or where different zones reflect different light intensities via the depth scan back into the aperture due to the lighting conditions. This allows for a complete measurement of object surfaces, which according to conventional technology would have been measurable only imprecisely or only partially since individual zones would be too dark or overexposed. In the case of a panorama optics, for example, which is used, e.g., to illuminate a conical valve seat, the main reflective direction of the more or less bundled reflected light may be directed into regions outside of the aperture of the measuring optics due to the curved or sphere-segment-shaped wavefront in eccentric illumination sections such that from this region or this zone of the object surface relatively little light is reflected back into the aperture and thus, without the measures according to the present invention, the light of this region would be severely swamped out by light reflected back from corresponding regions of the reference plane, resulting in correspondingly weak interference contrasts that are difficult to evaluate. By contrast, the measures according to the present invention substantially increase the measuring precision even in such dark zones. Conversely, they also prevent the measuring precision from being reduced by zones of the object surface that are too bright. The measures according to the present invention are largely able to compensate for corresponding effects of the reflectivity of the object surface with respect to the aperture even in curved surface zones or surface zones that reflect at different intensities in the same direction.

In an advantageous refinement of the example measuring device, the adaptation device is configured to control the light source in a temporally variable manner and for this purpose has an open-loop or closed-loop control unit, which is constructed in such a way that the quantity of light given off by the light source is increased when viewing measuring points of low irradiation of reflected light from the surface into the aperture of the measuring optics and/or is decreased when viewing measuring points of higher irradiation of reflected light. By open-loop or closed-loop control of the light source, the illumination of the object surface is optimally adjusted to the respectively viewed measuring points.

In other advantageous refinements, the adaptation device may have at least one filter that is electrically controlled in a temporally variable manner, to which end there exists a possibly additional open-loop or closed-loop control unit, which is constructed in such a way that, when at least one filter is situated in the input light path, in the measuring light path and/or in the output light path, the light transmission of the filter or filters is increased when viewing measuring points of low irradiation of reflected light from the surface into the aperture of the measuring optics and/or is reduced when viewing measuring points of higher irradiation into the aperture, and that with a controllable filter or filters—possibly additionally—located in the reference light path, the light transmission of the latter is reduced when viewing measuring points of lower irradiation into the aperture and/or is increased when viewing measuring points of higher irradiation into the aperture. Due to the temporal control of the light intensity in coordination with the viewed measuring point of the object surface, these measures also achieve a highest possible interference contrast that is readily evaluated.

A further or additional possibility of obtaining precise measuring results on surfaces having zones of varying reflectivity with respect to the aperture is to have an open-loop or closed-loop control unit associated with the image pickup configured in such a way that the sensitivity of the image pickup is increased when viewing measuring points of lower irradiation of reflected light from the surface into the aperture of the measuring optics and that the sensitivity of the image pickup is reduced when viewing measuring points of higher irradiation into the aperture. By selecting optimal operating ranges of the image pickup in combination with the electronics connected in the outgoing circuit it is thus possible to avoid overexposures or underexposures for example.

If the adaptation device is provided to have at least one static filter situated in the input light path, in the measuring light path, in the reference light path and/or in the output light path, which is adapted in its local light transmission characteristic to the local intensity characteristic of the irradiation from the surface into the aperture of the measuring optics, then it is possible to undertake a concurrent adaptation to varying reflectivities of the surface with respect to the aperture so as to obtain optimal interference contrasts. The adaptation of the filter or filters occurs, e.g., by a reference pattern of the object surface and/or the properties of the measuring optics such as a panorama optics for example.

An advantageous refinement of the present invention adapts the local characteristic of the intensity of the light reflected from the surface in the measuring light path and in the reference light path to each other, whereby the best possible interference contrast is obtained at all simultaneously measured points of measurement.

In an advantageous embodiment of the example measuring device, the light source is configured to emit short coherent light and there is a measuring device that is configured for performing a depth scan and an evaluation by white-light interferometry. For a measurement in narrow cavities with an ease of operation, it is advantageous if the measuring device in the measuring light path has an endoscope optics.

Measurement in locations that are difficult to access is facilitated further if the measuring device in the measuring light path has an optical setup that produces a flat intermediate image.

Another advantageous refinement of the present invention for covering relatively large and specifically shaped regions or zones of the surface and for measuring them precisely has a panorama optics situated in the measuring light path on the object side.

BRIEF DESCRIPTION OF THE DRAWINGS

Using exemplary embodiments, the present invention is explained in detail below with reference to the figures.

DETAILED DESCRIPTION OF EXAMPLE EMBODIMENTS

Figure 1:
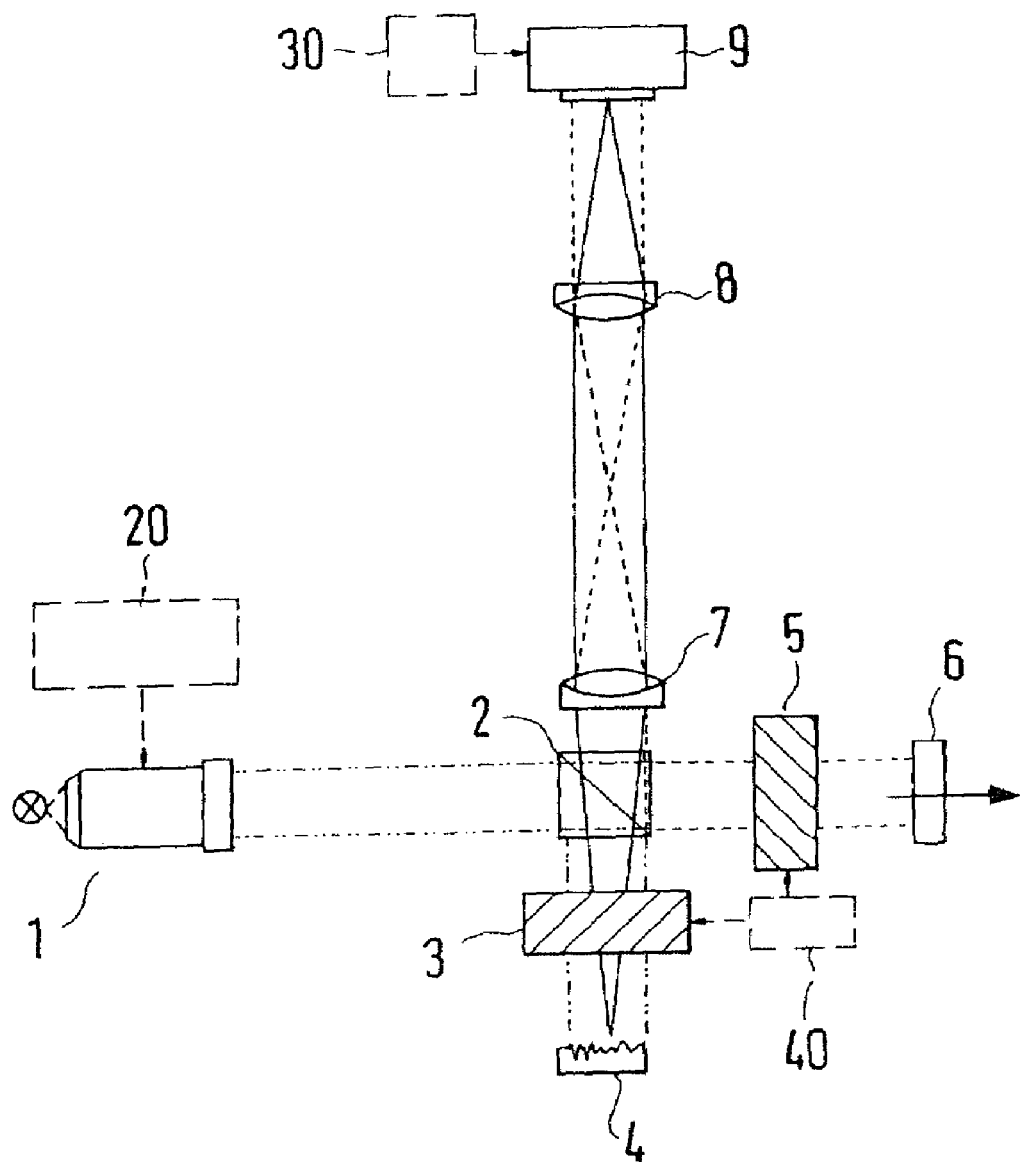
FIG. 1 shows a schematic representation of a first exemplary embodiment of an interferometric measuring device for the three-dimensional measuring of shapes of objects to be measured having an adaptation device.

An interferometric measuring device shown in FIG. 1 for the three-dimensional measuring of shape of the surface of an object 4 by depth scan (in the z-direction) has a light source 1, from which light is fed via an input light path to a beam splitter 2, which splits the light and feeds it via a measuring light path to the object surface and via a reference light path to a reference 6 having a reflecting plane, in particular a mirror. A filter 3 is situated in the measuring light path on the object side and a filter 5 is situated in the reference light path on the reference side. Light reflected from object 4 and from reference 6 is superimposed and is fed from beam splitter 2 via an output light path having an objective 7 and an eyepiece 8 to an image pickup 9, in which the light signals and the interferences contained therein are converted into electrical signals and are subsequently processed in an evaluation unit for determining the surface shape. Open-loop or closed-loop control units 20, 40 and 30 may be respectively assigned to light source 1, object-side filter 3 and reference-side filter 5, and/or image pickup 9 and may be implemented in a common control unit using a microcontroller.

As shown in FIG. 1, the surface of object 4 has zones of varying reflectivity with respect to the measuring optics or its aperture. If for example a measuring point in a relatively dark region or a dark zone of the object surface is viewed during the measuring process, then with a uniformly reflective reference plane, particularly a reference mirror, reference light of relatively high intensity will be superimposed such that the interference contrast at image pickup 9 is relatively low and is difficult to evaluate with the help of the evaluation unit. For this reason, the interferometric measuring device is provided with an adaptation device, which is used to equalize the varying reflectivity of the surface zones of object 4. The adaptation device comprises object-side filter 3 and/or reference-side filter 5 and may further include the open-loop or closed-loop control unit of light source 20 and/or the open-loop or closed-loop control unit 30 of image pickup 9 or their triggering device. Furthermore, object-side filter 3 and/or reference-side filter 5 may be configured to be electrically controllable in their light transmission, to which end an open-loop or closed-loop control unit for filter(s) 3, 5 is then also provided.

If in the measurement, for example, a zone of the object surface having a lower reflectivity with respect to the aperture of the measuring optics is viewed, then open-loop or closed-loop control unit 20 of light source 1 may be used to trigger it to give off a higher quantity of light. This increases the quantity of light available for the evaluation as whole such that the evaluation can be improved. This also effects an increase of the light reflected from reference 6, however, such that the portion of the reference light in the superimposed object and reference light dominates and the interference contrast is relatively low. For this reason, for further improvement, either reference 6 itself may have zones that differ locally in reflectivity conforming to the surface of object 4 or an adaptation of the reference light to the object light may be performed by using a reference-side filter 5 such that both light portions are adapted as well as possible to each other and the highest possible interference contrast is obtained at any viewed measuring point.

Alternatively, a fixed quantity of light may be specified to light source 1, for example, and a mutual adjustment of filters 3 and 5 in the measuring light path and reference light path may be performed with a view to achieving the highest possible interference contrast. It is also possible to leave out object-side filter 3 and to perform an adjustment to the zones of varying reflectivity of the object surface only by reference-side filter 5. For this purpose, the adjustment to the respectively viewed measuring point of object 4 may occur in a temporally successive manner by controlling object-side filter 3 and/or reference-side filter 5. If in the process a zone of the object surface is viewed which has a relatively low reflectivity with respect to the aperture or which is relatively dark, then the evaluation of the occurring interferences can be improved by setting the sensitivity of image pickup 9 in an optimized way as a function of the viewed measuring point. The synchronization between the optionally provided control of filters 3 and/or 5 or the adjusted sensitivity and the viewed measuring point may be advantageously performed in the primary control unit.

In a further advantageous refinement, object-side filter 3 and/or reference-side filter 5, one of which may also be lacking, is from the start adapted in its light transmission statically to the reflectivity of the object surface with respect to all measuring points if the surface to be measured is essentially known. By this means the light portions of the reference light and of the object light are also adapted to each other in terms of their intensity so as to obtain an optimal interference contrast under the given measuring conditions. Similarly it is possible to adapt the reflectivity of reference 6 itself to the reflectivity of the object surface with respect to the aperture of the measuring optics in order to assimilate the portions of the reference light and of the measuring light to each other, this measure too being partially or completely combinable with the other measures mentioned.

When using object-side filter 3 in order to equalize different reflectivities of the object surface with respect to the aperture or object surface zones of varying brightness, this filter will have a higher light transmission with respect to darker surface regions than with respect to brighter surface regions. Conversely, when using reference-side filter 5, its light transmission is lower with respect to darker zones of the object surface and higher with respect to brighter zones of the object surface so as to obtain the desired adaptation of the portions of the reference light and of the object light.

Figure 2:
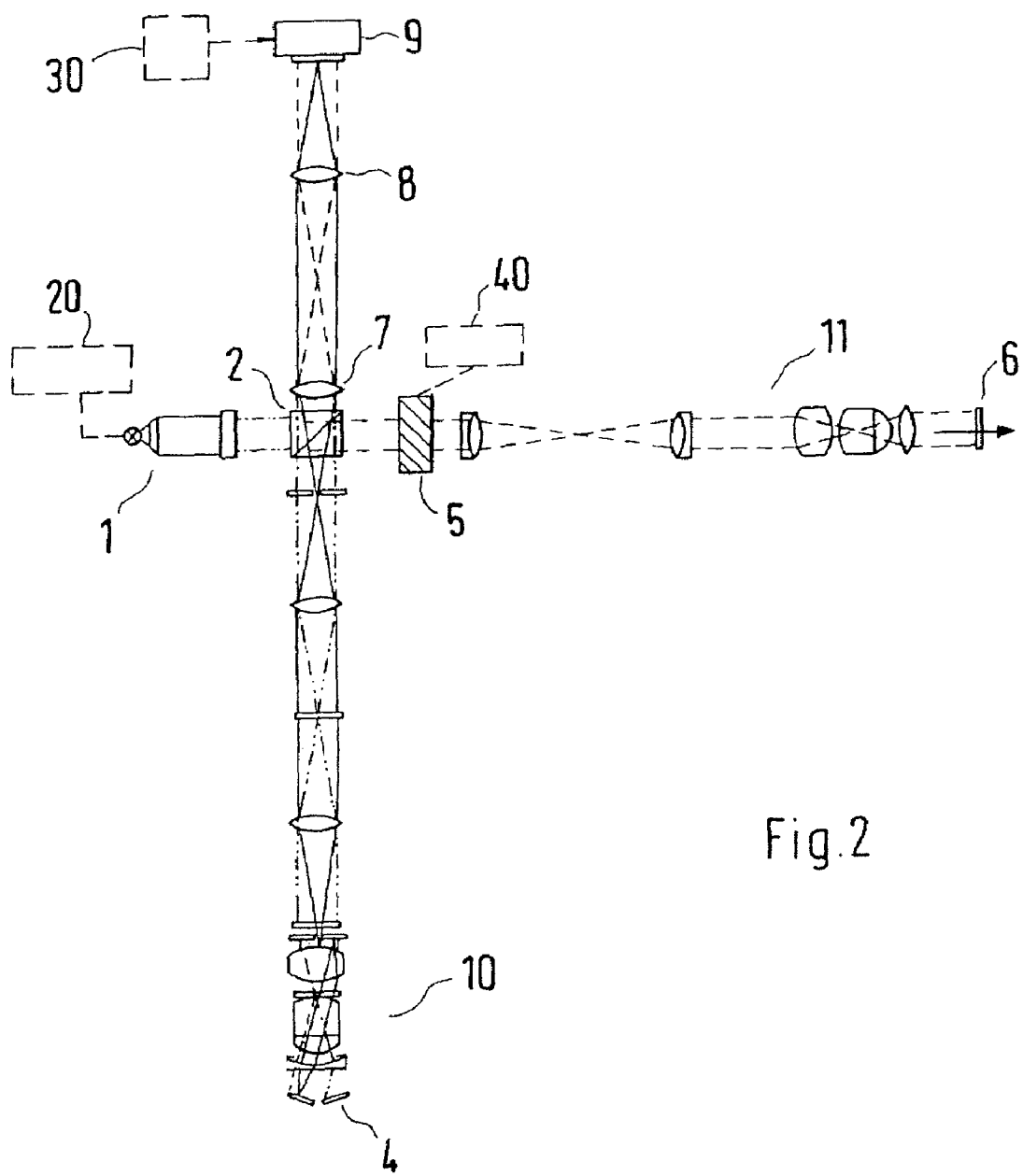
FIG. 2 shows a schematic representation of another exemplary embodiment of an interferometric measuring device for the three-dimensional measuring of shapes on objects to be measured having an adaptation device.

In the exemplary embodiment shown in FIG. 2, the object light path is provided with additional optical elements, which are used to obtain a flattened intermediate image e.g. of a conically shaped object surface. The intermediate image itself may be scanned, as is explained in detail for example in German Patent Application No. DE 101 15 524 A1, to which reference is made in this regard. Further, a panorama optics is situated in the object light path for covering a peripheral surface region for a simple measurement of a valve seat as explained in detail in German Patent Application No. DE 101 31 778 A1. In a panorama optics of this type, a curvature in the shape of a segment of a sphere is formed, for example, in the region of a wavefront illuminating the object surface, whereby the reflected light in an edge region of the illumination is partially reflected in a direction lying outside of the aperture of the measuring optics so that these zones appear darker through the measuring optics. The adaptation device described above in connection with FIG. 1 is also advantageous for compensating such darker zones which are due to the reflectivity of the surface to be measured with respect to the aperture of the measuring optics. For this purpose, for example, reference-side filter 5 may be designed as static and may be adapted to the properties of panorama optics 10 in accordance with the above explanations. A reference arm optics 1 is also advantageously adapted to panorama optics 10 in order to achieve further compensations of the influences on the light by the optical elements situated in the object light path.

The described design of the interferometric measuring device further provides for the object to remain immobile with respect to the objective during the depth scan. The deep scan occurs, for example, by a scan of reference mirror 6, scan of the interferometer by active optical modulators (not shown) or in a separate modulation interferometer. The depth scan as such is performed in a conventional manner.

In the adaptation explained above of the quantity of light emitted by light source 1, the light intensity during the scanning process is controlled in such a way that the relevant measuring area, i.e., the area in which interference phenomena occur (which for practical purposes corresponds to the focus area) is illuminated in such a way that the interference phenomena display a great contrast, that is, show great bright-dark intensity fluctuations on image pickup 9 or in the camera during the scan. This light control may be performed dynamically during scanning by a suitable control system (contrast optimization) or statically in that a reference object is scanned in advance and the ideal intensity characteristic is recorded over time. This can be explained for example with reference to a sphere: If the focus area of the interferometer lies at the upper edge of the sphere, distinct interference phenomena and a good reflection of the occurring light will be expected. For this reason, the light intensity of light source 1 may in this case be set relatively low. The scan is performed further on the side of the sphere and downward where the slopes of the sphere become steeper. As a result, less light is reflected back into the aperture and an increase of the light source intensity is required.

A time-modulated object-side and/or reference-side filter 3, 5 is a filter which is coupled with a scan unit performing the surface scan and which adapts the transmission during the scan. This may be done dynamically in that the light intensity is recorded via the control unit of the camera of the interferometer and evaluated and controlled via a suitable control system. Characteristics relevant for the control are, for example, fluctuations in intensities in an image element (pixel), which should be as great as possible, i.e., should yield a maximum of contrast of the interference phenomena. Similarly, static control methods are possible, which are ascertained, for example, by a reference object. To this end, a reference object is scanned beforehand and the transmission of the relevant filter is adapted accordingly so as to ensure the best possible contrast of the interference strips. As already mentioned, this optimization of the transmission concerns the regions on object 4 which lie in the focus area (or near the focus area) of the interferometric measuring device.

The use of a static filter with spatially inhomogeneous transmission takes into account that the object may reflect the light to different degrees due to different topographies and/or surface properties. Filter or filters 3, 5 used in the present case are adapted to object 4 or to a reference object such that in the ideal case every object point displays an optimal contrast of the interference phenomenon. The ideal transmission distribution of filter 3, 5 may be calculated beforehand, for example, by a geometric model of object 4 or may be determined experimentally by measuring a reference object.

What is claimed is:

1. An interferometric measuring device for the three-dimensional measurement of a shape on an object to be measured, comprising:
    a beam splitter configured to receive light from a light source via an input light path and to split the light into a measuring light path and a reference light path;
    an image pick-up to which light, reflected back from the object to be measured and from a reference and brought into interference, is supplied via an output light path for conversion into electrical signals;
    an evaluation unit configured to determine a surface shape from the signals; and
    an adaptation device configured to adapt one of light intensity or signals received from the interfering light;
    wherein the measuring device is configured to measure planar regions of a surface of the object which extend over at least a lateral resolution of the measuring device and wherein the adaptation device is configured to adjust as a function of locally varying reflective properties of the surface with respect to measuring optics, at least one of the light intensity and signals obtained from the light.

2. The measuring device as recited in claim 1, wherein the adaptation device is configured to control the light source in a temporally variable manner, the adaptation device including an open-loop or closed-loop control unit, which is configured in such a way that a quantity of light given off by the light source is at least one of: i) increased when viewing measuring points of low irradiation of reflected light from the surface into an aperture of the measuring optics, and ii) decreased when viewing measuring points of higher irradiation of reflected light.

3. The measuring device as recited in claim 2, wherein the adaptation device includes at least one filter that is electrically controlled in a temporally variable manner, the adaptation device including an open-loop or closed-loop control unit which is configured in such a way that, when at least one filter is situated in the input light path, in at least one of measuring light path and an output light path, light transmission of the filter is one of: i) increased when viewing measuring points of low irradiation of reflected light from the surface into the aperture of the measuring optics, and ii) reduced when viewing measuring points of higher irradiation into the aperture, and that with at least one controllable filter located in the reference light path, light transmission of the at least one controllable filter is one of: i) reduced when viewing measuring locations of lower irradiation into the aperture, and ii) increased when viewing measuring locations of higher irradiation into the aperture.

4. The measuring device as recited in claim 1, further comprising:
    an open-loop or closed-loop control unit associated with the image pickup, configured in such a way that sensitivity of the image pickup is increased when viewing measuring points of lower irradiation of reflected light from the surface into the aperture of the measuring optics, and the sensitivity of the image pickup is decreased when viewing measuring points of higher irradiation into the aperture.

5. The measuring device as recited in claim 1, wherein the adaptation device has at least one static filter situated in at least one of the input light path, the measuring light path, the reference light path and the output light path, the static filter being having a local light transmission characteristic adapted to a local intensity characteristic of irradiation from the surface into the aperture of the measuring optics.

6. The measuring device as recited in claim 5, wherein the local characteristic of the intensity of the light reflected from the surface in the measuring light path and in the reference light path are adapted to each other.

7. The measuring device as recited in claim 1, wherein the light source is configured to emit short coherent light, and wherein the measuring device further comprises:
    a measuring device configured to perform a depth scan and an evaluation by white-light interferometry.

8. The measuring device as recited in claim 7, wherein the measuring device has endoscope optics in the measuring light path.

9. The measuring device as recited in claim 7, wherein the measuring device has an optical setup producing a flat intermediary image in the measuring light path.

10. The measuring device as recited in claim 1, wherein a panorama optics is situated in the measuring light path on the object side.

* * * * *